United States Patent
Marinov

(10) Patent No.: US 10,286,463 B2
(45) Date of Patent: May 14, 2019

(54) BEVEL LOCKING SYSTEM

(71) Applicants: Robert Bosch Tool Corporation, Broadview, IL (US); Robert Bosch GmbH, Stuttgart (DE)

(72) Inventor: Plamen V. Marinov, Mount Prospect, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 21 days.

(21) Appl. No.: 15/391,445

(22) Filed: Dec. 27, 2016

(65) Prior Publication Data

US 2018/0178296 A1    Jun. 28, 2018

(51) Int. Cl.
  *B23D 45/04* (2006.01)
  *B27B 5/29* (2006.01)
(52) U.S. Cl.
  CPC .............. *B23D 45/044* (2013.01); *B27B 5/29* (2013.01)
(58) Field of Classification Search
  CPC .... B23D 45/04; B23D 45/042; B23D 45/044; B23D 45/048; B23D 45/146; Y10T 83/7697; Y10T 83/7701; Y10T 83/7705; Y10T 83/8773; Y10T 83/7693
  See application file for complete search history.

(56) References Cited

U.S. PATENT DOCUMENTS

| | | | |
|---|---|---|---|
| 5,862,734 A * | 1/1999 | Brunson | B23D 45/048 83/471.3 |
| 6,631,661 B2 | 10/2003 | Brunson et al. | |
| 7,395,745 B2 * | 7/2008 | Gehret | B23D 47/02 83/468.3 |
| 8,176,823 B2 | 5/2012 | Lawlor | |
| 8,176,824 B2 | 5/2012 | Lawlor | |
| 8,931,386 B2 | 1/2015 | Lawlor | |
| 8,960,063 B2 | 2/2015 | Kaye, Jr. et al. | |
| 2004/0112190 A1 | 6/2004 | Hollis et al. | |

(Continued)

FOREIGN PATENT DOCUMENTS

| CA | 2437192 A1 * | 5/2004 | ........... B23D 45/044 |
|---|---|---|---|
| DE | 4404019 A1 * | 8/1995 | ........... B23D 45/048 |

OTHER PUBLICATIONS

Bosch GCM12JL User Manual; Dec. 16, 2016; pp. 1-12 and 26-37.
Bosch GCM12SDE User Manual; Dec. 21, 2016; pp. 1-14 and 27-38.
Bosch GCM12SD User Manual; Dec. 5, 2014; pp. 1-10 and 24-36.

*Primary Examiner* — Jennifer B Swinney
(74) *Attorney, Agent, or Firm* — Kathy K. Takeguchi; Maginot Moore & Beck LLP

(57) ABSTRACT

An apparatus includes a table assembly, a bevel post, a bevel pin, a spring, a locking arm, and a lever. The table assembly includes a table portion with a work surface and a hub portion with a first clamping surface. The bevel post includes a second clamping surface. The bevel pin pivotally connects the bevel post to the hub portion. The spring is configured to bias a movement of the bevel pin. The locking arm is configured to (i) disengage the spring such that the bevel pin releases the table assembly from the bevel post and (ii) engage the spring such that the bevel pin moves the table assembly towards the bevel post. The lever is movable between an unlocked position to provide an unclamped state and a locked position to provide a clamped state with respect to the first and second clamping surfaces.

20 Claims, 13 Drawing Sheets

(56) References Cited

U.S. PATENT DOCUMENTS

| | | | | |
|---|---|---|---|---|
| 2008/0210073 A1* | 9/2008 | Zhang | .................. | B23D 45/044 |
| | | | | 83/471.3 |
| 2009/0173200 A1* | 7/2009 | Aoyama | .............. | B23D 45/048 |
| | | | | 83/471.3 |
| 2009/0301277 A1* | 12/2009 | Ipatenco | .............. | B23D 45/048 |
| | | | | 83/471 |

* cited by examiner

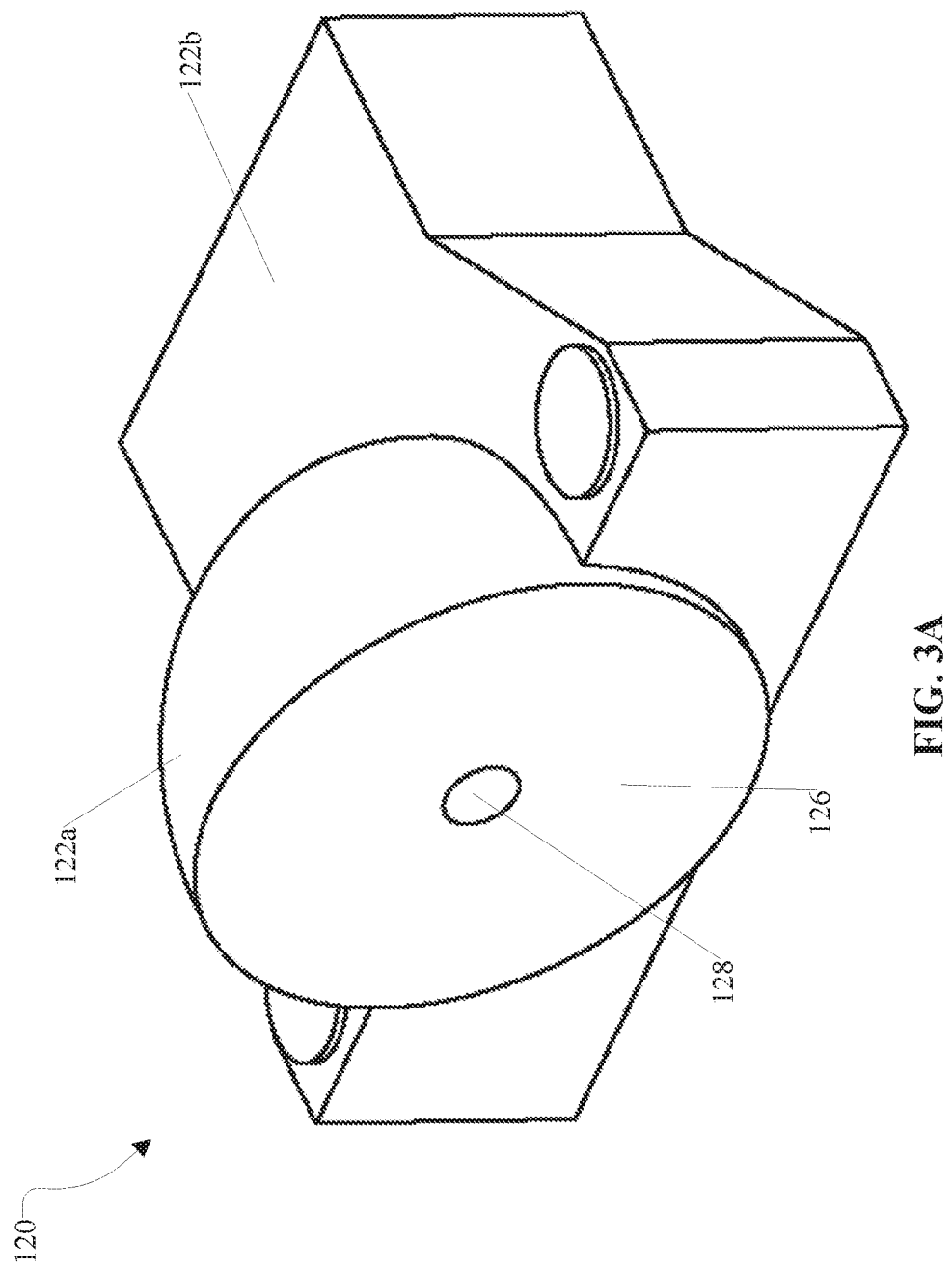

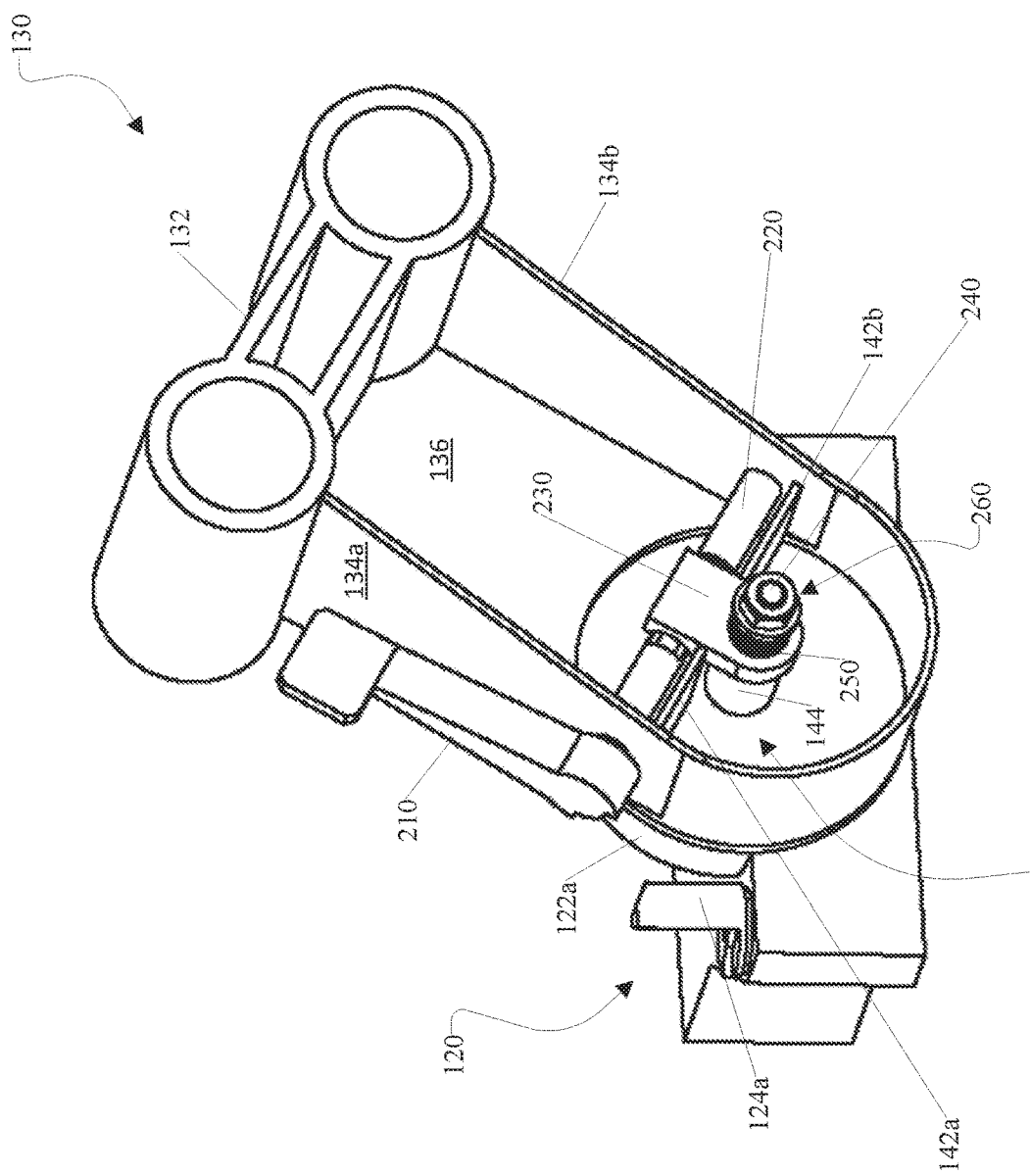

BEVEL LOCKING SYSTEM

FIELD OF THE INVENTION

This disclosure relates to a bevel locking system.

BACKGROUND

A saw apparatus, such as a miter saw apparatus, may include a bevel assembly. In general, the bevel assembly includes a handle, which is configured to transition the saw apparatus from an unlocked state to a locked state, and vice versa. In the unlocked state, the bevel assembly enables a cutting assembly to pivot to various bevel angle positions. In the locked state, the bevel assembly is configured to maintain a bevel angle position of the cutting assembly.

However, some handles are located on rear sides of the saw apparatuses. In these cases, the handles are located behind the cutting assemblies and out of reach, thereby being difficult to access and manipulate. On the other hand, there are some saw apparatuses that provide handles, which are located on front or lateral sides of the saw apparatuses, but include brake pads, brake rotors, control assemblies, and other hardware devices. As such, these types of bevel assemblies include several drawbacks.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a bevel locking system includes a bevel pin, a spring, a locking arm, and a lever. The bevel locking system is configured to provide an unlocked state and a locked state to a table assembly relative to a bevel post. The table assembly includes a table portion with a work surface and a hub portion with a first clamping surface. The bevel post includes a second clamping surface. The bevel pin pivotally connects the bevel post to the hub portion. The spring is configured to bias a movement of the bevel pin. The locking arm is configured to (i) disengage the spring such that the bevel pin releases the table assembly from the bevel post in a first direction and (ii) engage the spring such that the bevel pin moves the table assembly towards the bevel post in a second direction. The lever is movable between an unlocked position and a locked position. When the lever is in the unlocked position, the first clamping surface of the hub portion is in an unclamped state with the second clamping surface of the bevel post. When the lever is in the locked position, the first clamping surface of the hub portion is in a clamped state with the second clamping surface of the bevel post.

In an example embodiment, a power tool apparatus includes at least a power tool, a table assembly, a bevel post, a bevel pin, a spring, a locking arm, and a lever. The table assembly includes a table portion with a work surface for the power tool and a hub portion with a first clamping surface. The bevel post includes a second clamping surface. The bevel pin pivotally connects the bevel post to the hub portion. The spring is configured to bias a movement of the bevel pin. The locking arm is configured to (i) disengage the spring such that the bevel pin releases the table assembly from the bevel post in a first direction and (ii) engage the spring such that the bevel pin urges the table assembly toward the bevel post in a second direction. The lever is movable between an unlocked position and a locked position. When the lever is in the unlocked position, the first clamping surface of the hub portion is in an unclamped state with the second clamping surface of the bevel post. When the lever is in the locked position, the first clamping surface of the hub portion is in a clamped state with the second clamping surface of the bevel post.

In an example embodiment, a saw apparatus includes a cutting assembly, a table assembly, a bevel post, a bevel pin, a spring, a locking arm, and a lever. The cutting assembly includes a cutting blade. The table assembly includes a table portion with a work surface for the cutting blade and a hub portion with a first clamping surface. The bevel post is configured to support the cutting assembly. The bevel post includes a second clamping surface. The bevel pin pivotally connects the bevel post to the hub portion. The spring is configured to bias a movement of the bevel pin. The locking arm is configured to (i) disengage the spring such that the bevel pin releases the table assembly from the bevel post in a first direction and (ii) engage the spring such that the bevel pin moves the table assembly towards the bevel post in a second direction. The lever is movable between an unlocked position and a locked position. When the lever is in the unlocked position, the first clamping surface of the hub portion is in an unclamped state with the second clamping surface of the bevel post. When the lever is in the locked position, the first clamping surface of the hub portion is in a clamped state with the second clamping surface of the bevel post.

These and other features, aspects, and advantages of the present invention are further clarified by the following detailed description of certain exemplary embodiments in view of the accompanying drawings throughout which like characters represent like parts.

BRIEF DESCRIPTION OF THE DRAWINGS

FIG. 3A is a perspective view of a top side of the table assembly according to an example embodiment of this disclosure.

FIG. 4B is a perspective view of a rear side of the bevel post with components of the bevel locking system according to an example embodiment of this disclosure.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
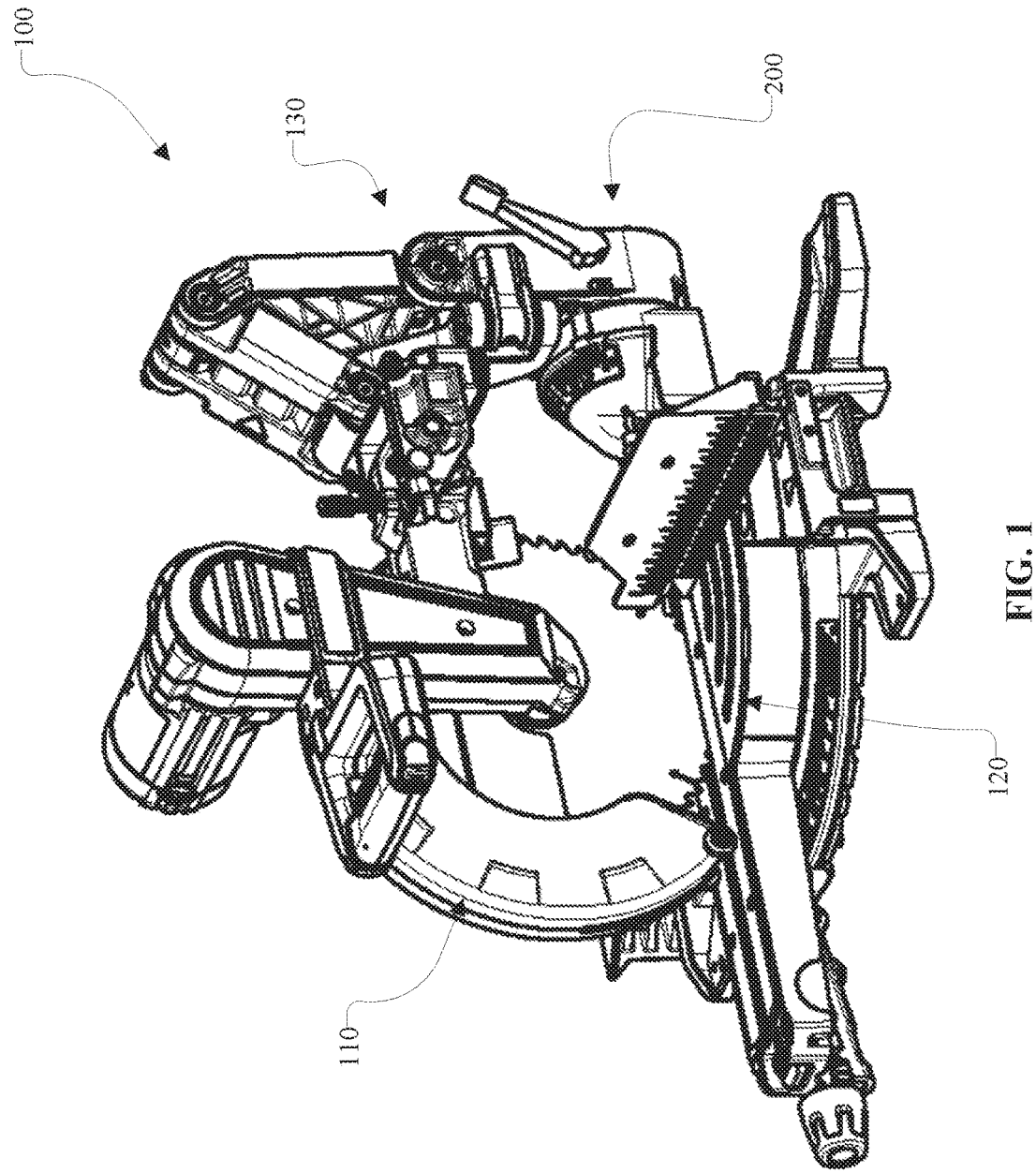
FIG. 1 is a perspective view of a power tool apparatus according to an example embodiment of this disclosure.

FIG. 1 is a perspective view of a power tool apparatus 100 according to an example embodiment. In an example embodiment, the power tool apparatus 100 includes a power tool assembly 110, a table assembly 120, and a support assembly 130. In an example embodiment, the power tool assembly 110 includes at least one power tool. For example, in FIG. 1, the power tool apparatus 100 is a saw apparatus (e.g. miter saw apparatus or the like) with a power tool assembly 110 that includes at least one cutting tool. Also, in an example embodiment, the power tool assembly 110 is supported by the support assembly 130. For instance, in FIG. 1, the support assembly 130 pivotally connects the power tool assembly 110 to the table assembly 120. Additionally or alternatively, the power tool apparatus 100 can include other components, which are not specifically mentioned.

Figure 6A:
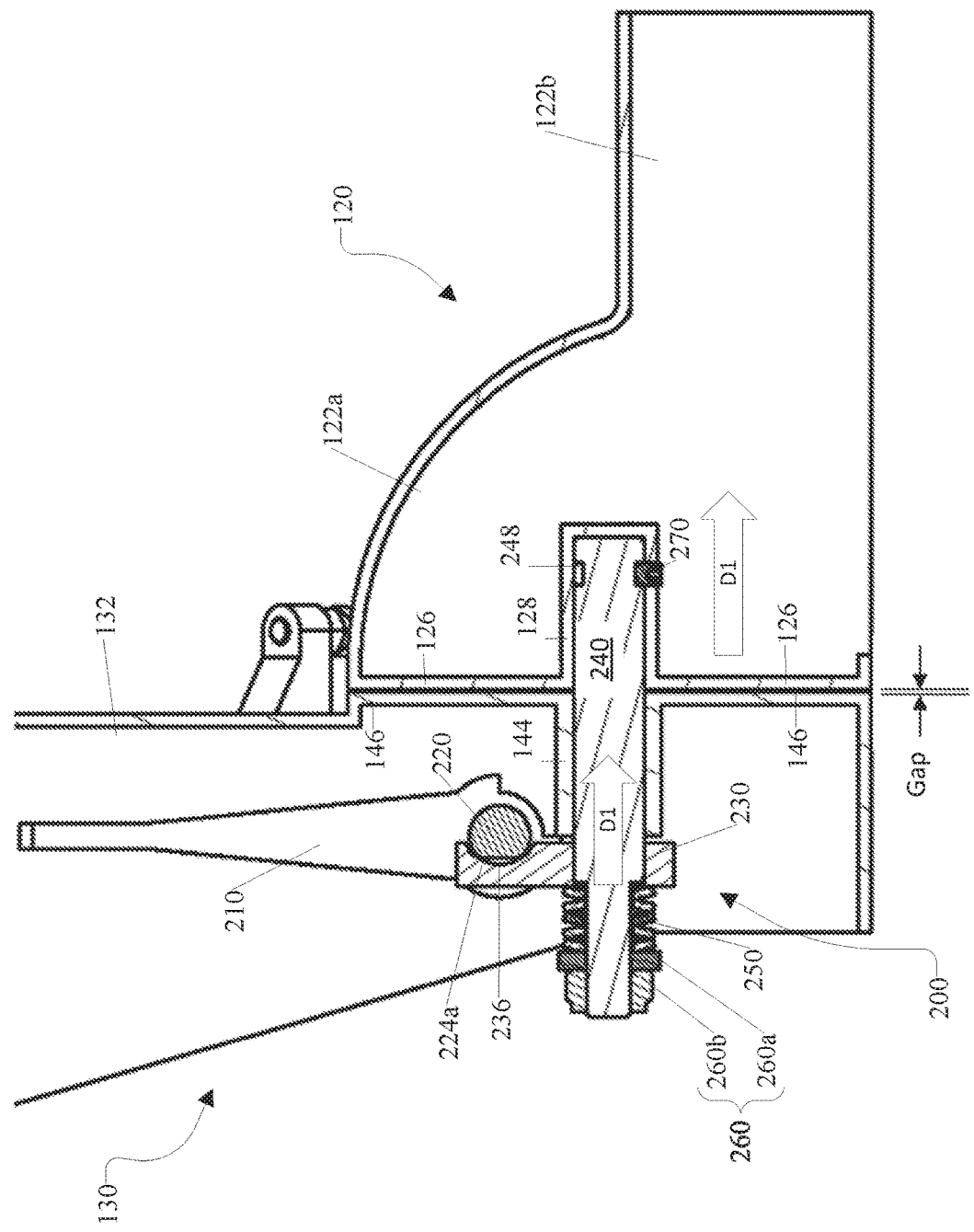
FIG. 6A is a cross-section of a side view of the support assembly and the table assembly in an unlocked state according to an example embodiment of this disclosure.
Figure 6B:
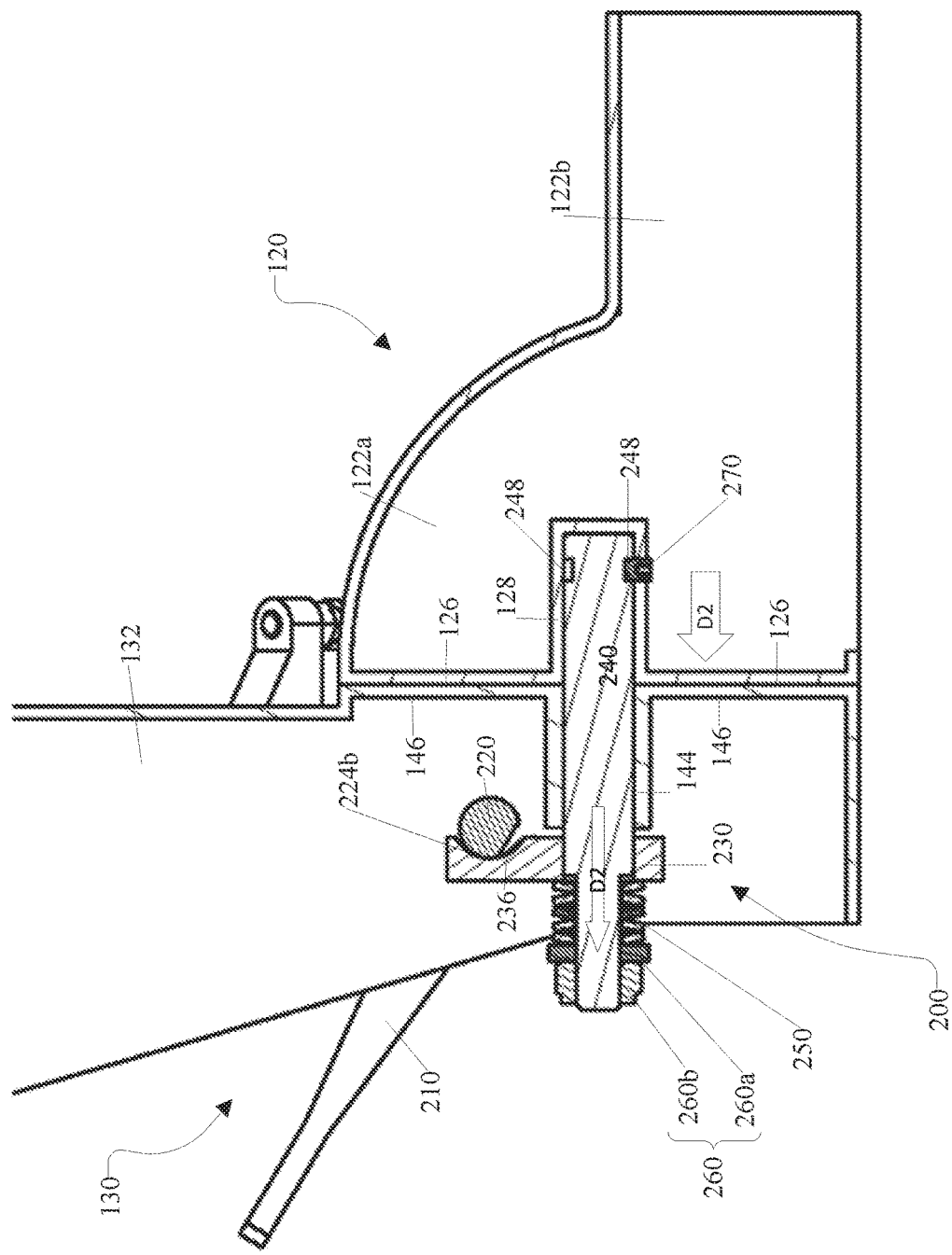
FIG. 6B is a cross-section of a side view of the support assembly and the table assembly in a locked state according to an example embodiment of this disclosure.

In an example embodiment, the power tool apparatus 100 includes a bevel locking system 200. In an example embodiment, the bevel locking system 200 is configured to provide an unlocked state (or an unclamped state) and a locked state (or a clamped state) of the table assembly 120 relative to the support assembly 130. In the unlocked state, the bevel locking system 200 enables the power tool to pivot to various bevel angle positions. In the locked state, the bevel locking system 200 is configured to maintain a bevel angle position of the power tool. To provide these states, in an example embodiment, the bevel locking system 200 includes several components, such as a lever 210, a cam shaft 220, a locking arm 230, a bevel pin 240, a spring 250, a mechanical fastener 260, and a mechanical fastener 270 (FIGS. 6A-6B). In this regard, the bevel locking system 200 is implemented in connection with structures provided by the table assembly 120 and the support assembly 130.

Figure 2:
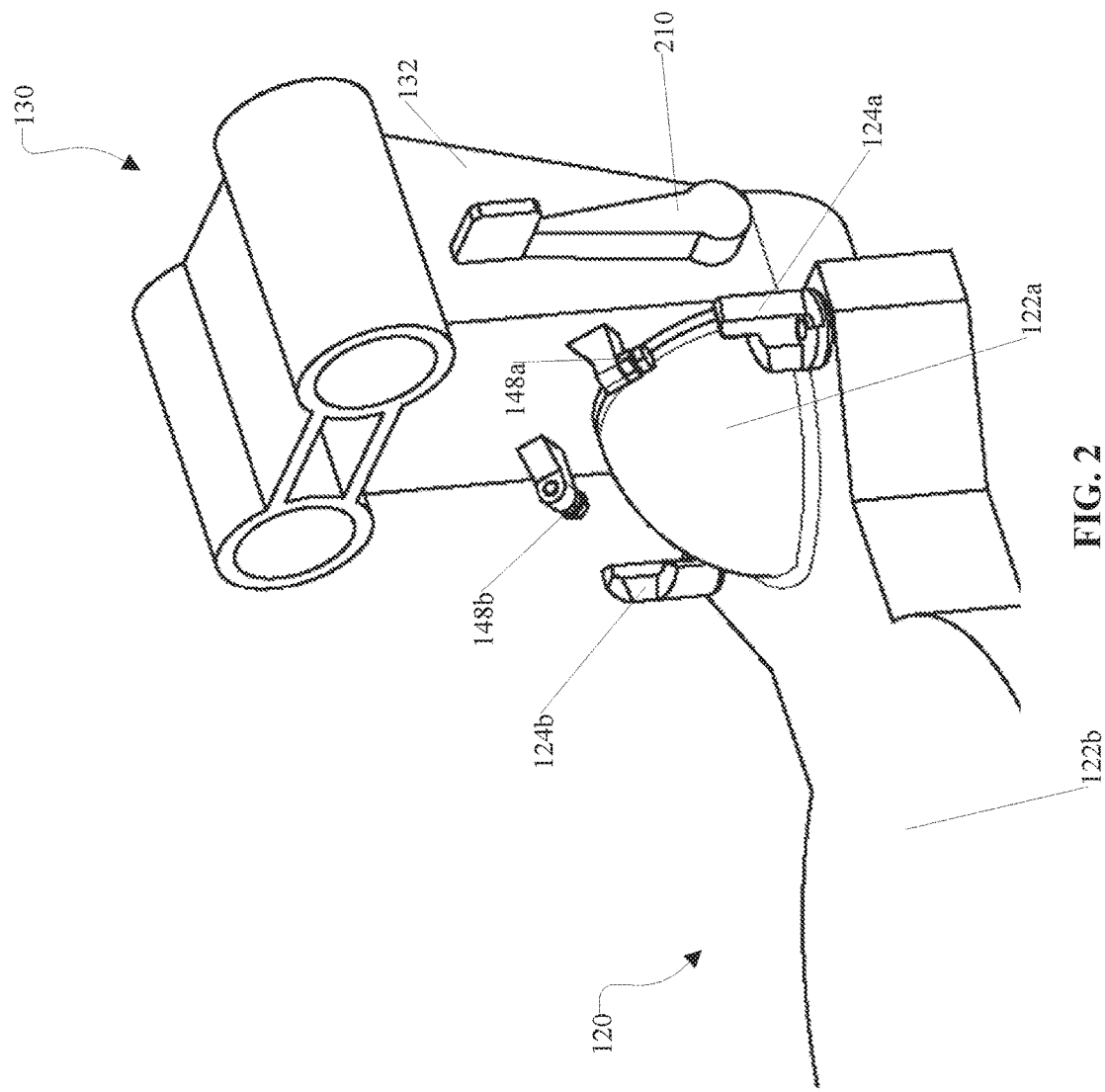
FIG. 2 is a perspective view of a front side of the support assembly in relation to the table assembly according to an example embodiment of this disclosure.

FIG. 2 illustrates a perspective view of a front side of the support assembly 130 in relation to the table assembly 120 according to an example embodiment. In an example embodiment, as shown in FIG. 2, the support assembly 130 includes a support mechanism, such as a bevel post 132, which is configured to engage with a hub portion 122a of the table assembly 120. With the inclusion of the hub portion 122a, the table assembly 120 is able to provide a table portion 122b with a suitable work surface for the power tool assembly 110. Additionally or alternatively, the support assembly 130 and the table assembly 120 can include other components, which are not illustrated in FIG. 2.

Figure 5A:
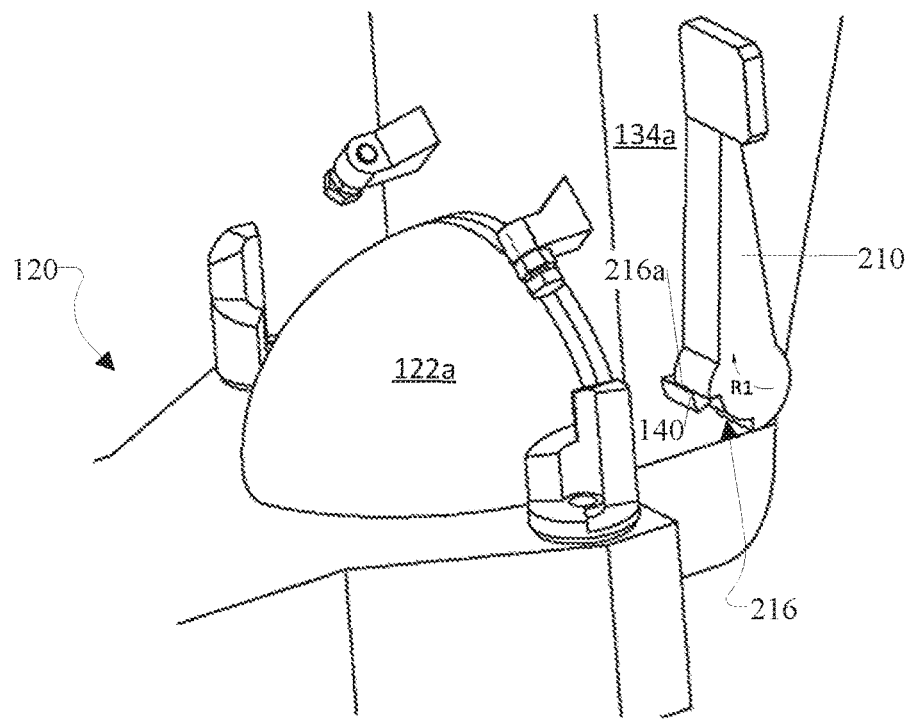
FIG. 5A is a perspective view of the lever in the first position and the bevel locking system in an unlocked state according to an example embodiment of this disclosure.
Figure 5B:
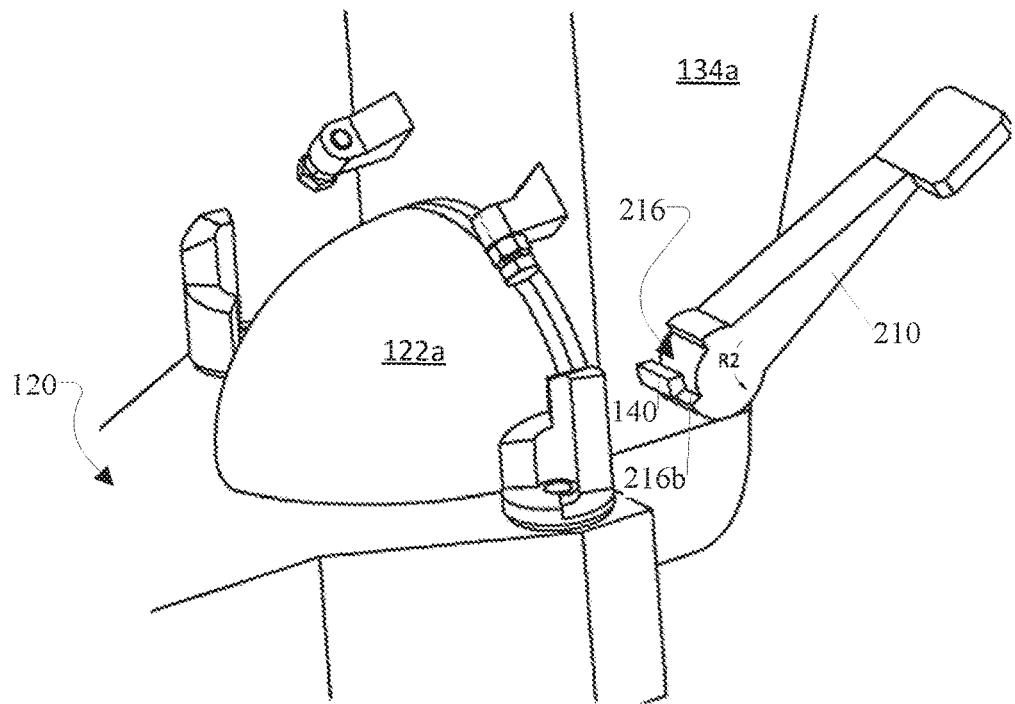
FIG. 5B is a perspective view of the lever in the second position and the bevel locking system in a locked state according to an example embodiment of this disclosure.

In an example embodiment, the support assembly 130 includes the bevel post 132 in which a lever 210 is disposed on a lateral surface of the bevel post 132. In an example embodiment, the lever 210 is movable from a first position (e.g., "unlocked position") to a second position (e.g., "locked position"), and vice versa. For example, when in the first position (or the unlocked position), as shown in FIGS. 5A and 6A, the lever 210 is configured to provide an unclamped state (or an unlocked state) in which the bevel post 132 is movable to different bevel angle positions relative to the table assembly 120. Alternatively, when in the second position (or the locked position), as shown in FIGS. 5B and 6B, the lever 210 is configured to provide a clamped state (or a locked state) in which the bevel post 132 is secured to the table assembly 120 at a selected bevel angle position.

In an example embodiment, the bevel post 132 includes a first stopper 148a and a second stopper 148b, as shown in FIG. 2. In an example embodiment, the first stopper 148a is configured to prevent a continued movement of the bevel post 132 beyond a predetermined bevel angle in a first pivotal direction by abutting against a first post (or a first turret) 124a on the table assembly 120. Similarly, in an example embodiment, the second stopper 148b is configured to prevent a continued movement of the bevel post 132 beyond a predetermined bevel angle in a second pivotal direction by abutting against a second post (or a second turret) 124b on the table assembly 120. In this regard, the movement of the bevel post 132 is able to be controlled within a predetermined range in relation to the table assembly 120.

Figure 3B:
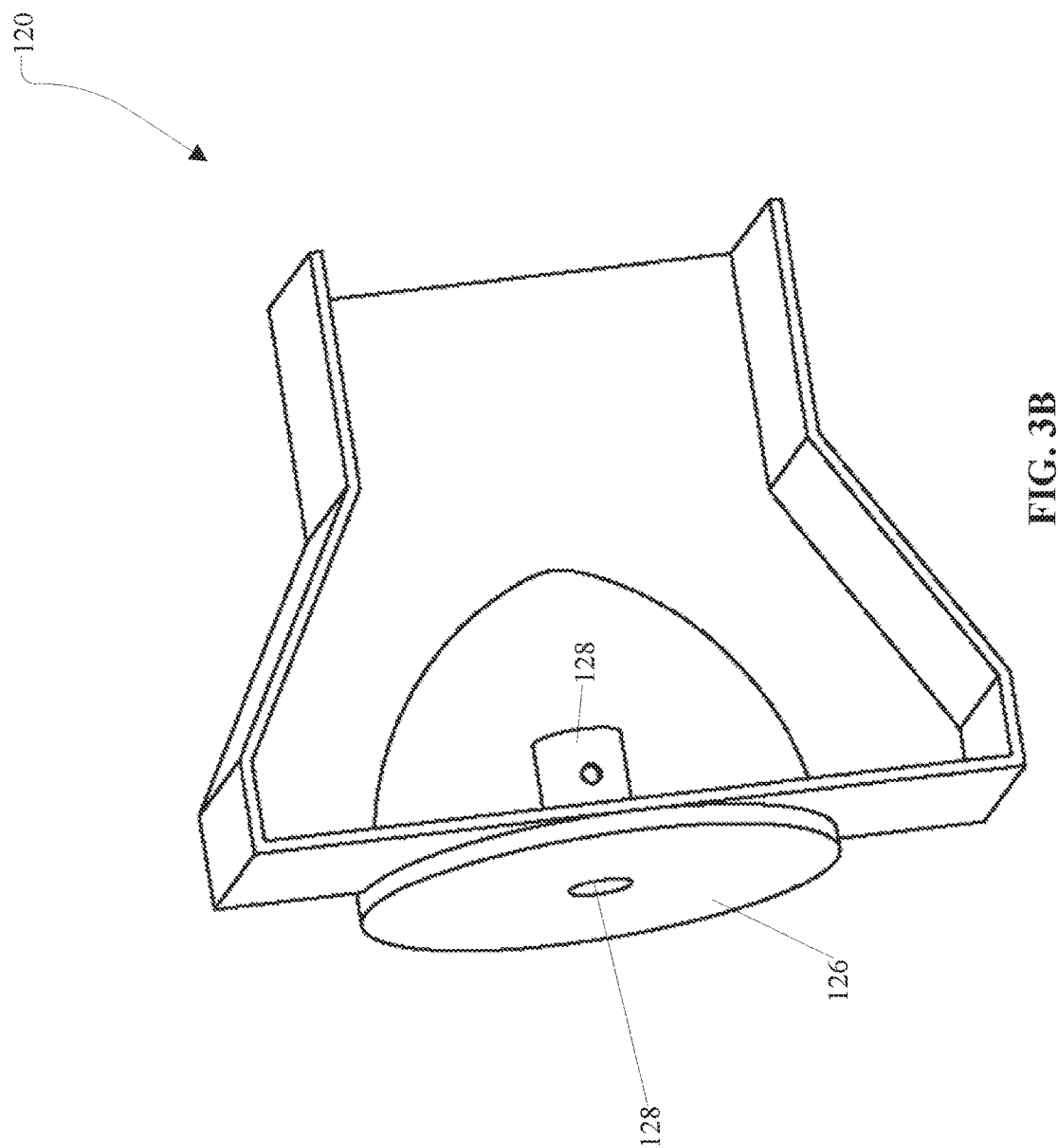
FIG. 3B is a perspective view of a bottom side of the table assembly according to an example embodiment of this disclosure.

FIGS. 3A and 3B are perspective views of the table assembly 120 according to an example embodiment. More specifically, FIG. 3A is a perspective view of a top side of the table assembly 120 according to an example embodiment. FIG. 3B, on the other hand, is a perspective view of a bottom side of the table assembly 120 according to an example embodiment. As shown in each of FIGS. 3A-3B, the table assembly 120 includes at least the hub portion 122a and the table portion 122b. In an example embodiment, the hub portion 122a and the table portion 122b are integrally formed such that they comprise a monolithic structure. Alternatively, in an example embodiment, the hub portion 122a and the table portion 122b are separate structures that are securely connected or bonded to each other to form a unitary member. In an example embodiment, irrespective of whether the hub portion 122a and the table portion 122b are separate or integral, the table assembly 120 comprises a material with mechanical integrity and strength to support a clamping force between the table assembly 120 and the bevel post 132 and provide a suitable work surface for the power tool assembly 110. In this regard, for example, the table assembly 120 comprises a metal material (e.g., non-ferrous metal material) or any suitable material. In an example embodiment, for instance, the table assembly 120 comprises aluminum, zinc, magnesium, or any appropriate combination thereof.

In an example embodiment, the hub portion 122a comprises a convex structure, which protrudes outward from a top surface of the table portion 122b. In an example embodiment, the hub portion 122a includes a clamping surface 126, which extends in a plane that is perpendicular to that of the top surface (or the work surface) of the table portion 122b. In an example embodiment, the clamping surface 126 is configured to clamp against a clamping surface 146 of the bevel post 132, as shown in FIG. 6B. In this regard, the clamping surface 126 of the table assembly 120 is a flat or substantially flat surface. Meanwhile, the clamping surface 146 of the bevel post 132 is a flat or substantially flat surface. In an example embodiment, the clamping surface 126 includes a protective covering, such as a wear plate, which comprises a metal material or a plastic material. Also, in an example embodiment, the clamping surface 146 includes a protective covering, such as a wear plate, which comprises a metal material or a plastic material. For instance, in FIGS. 6A-6B, the clamping surface 126 comprises a thin layer of brass. Similarly, the clamping surface 146, as shown in FIGS. 6A-6B, comprises a thin layer of brass. In an example embodiment, the clamping surface 126 is structured to have a similar or complementary configuration (e.g., size and shape) as that of the clamping surface 146 of the bevel post 132. In an example embodiment, the clamping surface 126 includes a bevel pin receiving portion 128, as shown in FIGS. 3A-3B.

In an example embodiment, the bevel pin receiving portion 128 is any suitable mechanical structure that is enabled to accommodate the bevel pin 240. In this regard, for example, the bevel pin receiving portion 128 is elongated in the same direction as that of the bevel pin 240. For example, in FIGS. 3A-3B, the bevel pin receiving portion 128 is a hollow cylindrical post, which is integral with the hub portion 122a and has an opening at a center region of the clamping surface 126. In an example embodiment, the bevel pin receiving portion 128 is structured to provide sufficient clearance so that the bevel pin 240 is enabled to move along a first direction D1, as shown in FIG. 6A, when the lever 210 transitions to the unlocked position and move along a second direction D2, as shown in FIG. 6B, when the lever 210 transitions to the locked position.

Figure 4A:
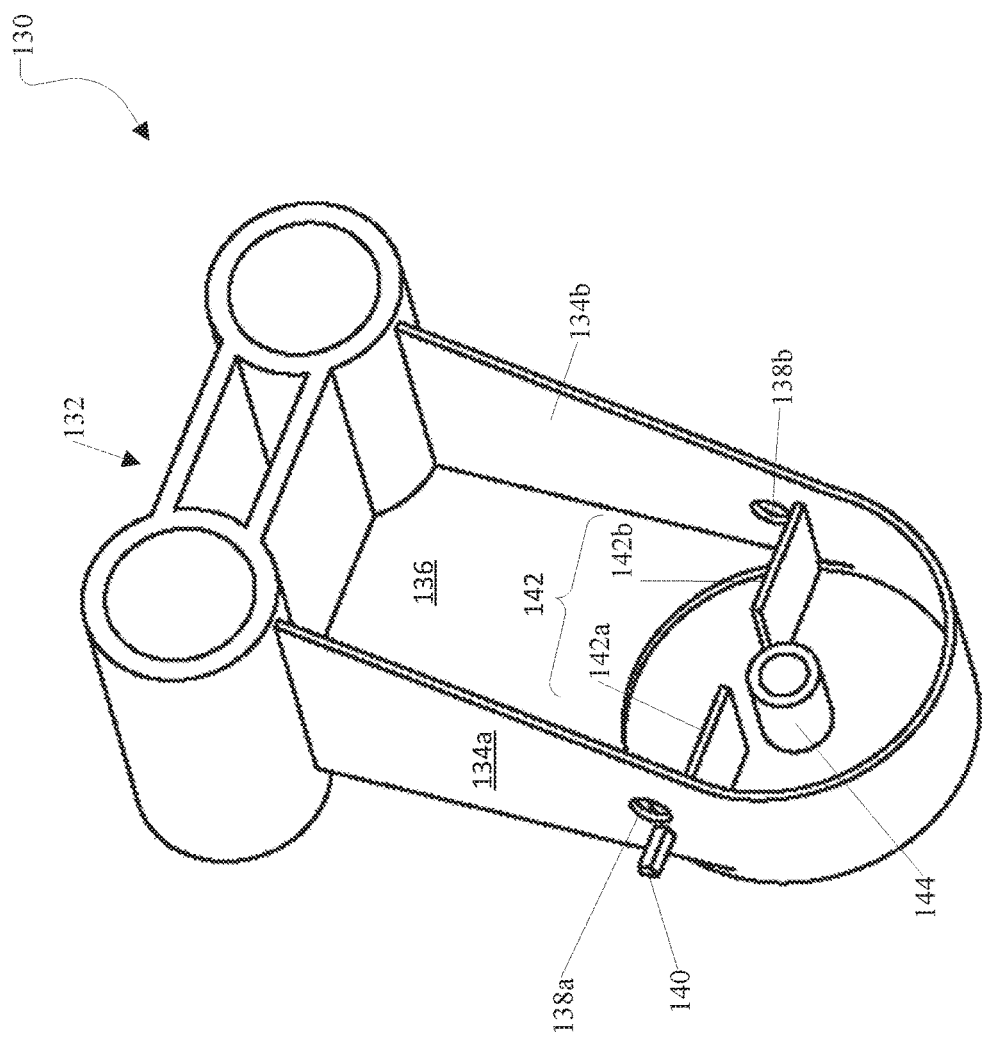
FIG. 4A is a perspective view of a rear side of the bevel post according to an example embodiment of this disclosure.

FIGS. 4A and 4B are perspective views of a rear side of the bevel post 132 (while FIG. 2 illustrates a front side of the bevel post 132) according to an example embodiment. For example, in FIGS. 4A and 4B, the bevel post 132 includes at least a first sidewall portion 134a, a second sidewall portion 134b, a surface 136, a holding portion 142, and a bevel pin receiving portion 144. In an example embodiment, the bevel post 132 comprises a rigid material, such as a metal material or any suitable material. For instance, in FIGS. 4A-4B, the bevel post 132 comprises die-cast aluminum.

In an example embodiment, the bevel post 132 is configured receive the cam shaft 220, as shown in FIG. 4B. In an example embodiment, the bevel post 132 includes a first through-hole 138a on the first sidewall portion 134a and a second through-hole 138b on the second sidewall portion 134b, as shown in FIG. 4A. Each of the first and second through-holes 138a and 138b is configured to receive and accommodate a corresponding end portion of the cam shaft 220. In an example embodiment, each of the first and second through-holes 138a and 138b provides sufficient clearance with respect to the cam shaft 220 such that the cam shaft 220 is able to rotate to different rotational positions.

In an example embodiment, the bevel post 132 is configured to house the locking arm 230, as shown in FIG. 4B. In an example embodiment, the bevel post 132 includes a holding portion 142, which is configured to ensure that the locking arm 230 is prevented from a rotational movement about the bevel pin 240. This feature of the holding portion 142 is particularly advantageous in preventing the locking arm 230 from disengaging with the cam shaft 220. In this regard, the holding portion 142 is structured to ensure proper engagement between the locking arm 230 and the cam shaft 220. For example, in FIGS. 4A-4B, the holding portion 142 includes a first rib 142a extending outwards from an interior surface of the first sidewall portion 134a and extending outwards from the surface 136. Also, in FIGS. 4A-4B, the holding portion 142 includes a second rib 142b extending outwards from an interior surface of the second sidewall portion 134b and extending outwards from the surface 136. In an example embodiment, the first rib 142a and the second rib 142b are spaced apart from each other to accommodate the locking arm 230, as shown in FIG. 4B. In this regard, for example, the locking arm 230 is advantageously supported on one side by the first rib 142a and on an opposite side by the second rib 142b. With this configuration, the locking arm 230 is configured to rotate together with the bevel post 132, thereby ensuring that the locking arm 120 interacts with the other components of the bevel locking system 200 in an appropriate manner.

In an example embodiment, the bevel post 132 includes a bevel pin receiving portion 144. The bevel pin receiving portion 144 is configured to receive the bevel pin 240 and provide sufficient clearance for the bevel pin 240 to move in the first direction D1, as shown in FIG. 6A, when the lever 210 transitions to the first position (or the unlocked position) and the second direction D2, as shown in FIG. 6B, when the lever 210 transitions to the second position (or the locked position). For example, in FIGS. 4A-4B, the bevel pin receiving portion 144 is a generally hollow cylindrical structure that is connected to or integral with the bevel post 132.

In an example embodiment, the bevel post 132 includes the lever 210 on a lateral surface thereof. For instance, in FIG. 4B, the lever 210 is located on a first sidewall portion 134a of the bevel post 132. Alternatively, in another example (not shown), the lever 210 is located on a second sidewall portion 134b of the bevel post 132. In this regard, the lever 210 is positioned to connect with an end portion of the cam shaft 220 so that a rotational movement of the lever 210 results in a rotational movement of the cam shaft 220. More specifically, for example, in FIG. 4B, the lever 210 is positioned to overlap with the first through-hole 138a of the first sidewall portion 134a.

In an example embodiment, to ensure that the lever 210 moves properly into the first and second positions, the bevel post 132 includes at least one guide component, which is configured to interact with at least one guide component of the lever 210. For instance, in FIGS. 5A-5B, the guide component of the bevel post 132 includes a protrusion 140 while the guide component of the lever 210 includes a recessed portion 216. Alternatively, in another example (not shown), these guide components of the bevel post 132 and the lever 210 can be reversed such that the bevel post 132 includes a recessed portion 216, which is configured to receive and interact with a protrusion 140 of the lever 210. In each of these examples, the guide components are configured to interact in a manner that guides the lever 210 into the first position (or the unlocked position) in which the bevel locking system 200 is in the unclamped state (or the unlocked state) and the second position (or the locked position) in which the bevel locking system 200 is in the clamped state (or the locked state).

FIG. 5A is a perspective view of the lever 210 in the first position (or the unlocked position) in which the bevel locking system 200 is in the unclamped state (or the unlocked state) according to an example embodiment. In FIG. 5A, the lever 210 is rotated into a position such that a first abutment surface 216a of the lever 210 abuts against the protrusion 140. In an example embodiment, the abutment of the protrusion 140 with that of the first abutment surface 216a of the lever 210 prevents a continued rotation of the lever 210 in a first rotational direction R1. In an example embodiment, this rotation of the lever 210 into the first position (or the unlocked position) causes the cam shaft 220 to rotate into the appropriate position such that the unclamped state (or the unlocked state) is achieved.

FIG. 5B is a perspective view of the lever 210 in the second position (or the locked position) in which the bevel locking system 200 is in the clamped state (or the locked state) according to an example embodiment. In FIG. 5B, the abutment of the protrusion 140 with that of the second abutment surface 216b prevents a continued rotation of the lever 210 in a second rotational direction R2. In an example embodiment, this rotation of the lever 210 into the second position (or the locked position) causes the cam shaft 220 to rotate into the appropriate position such that the locked state (or the clamped state) is achieved. In an alternative example embodiment (not shown), the positions of the lever 210 and/or the states of the bevel locking system 200 can be reversed from that of the example embodiment of FIGS. 5A-5B.

FIG. 6A is a cross-section of a side view of the support assembly 130 and the table assembly 120 in the unclamped state (or the unlocked state). In this regard, for example, when the lever 210 is in the first position (or the unlocked position), as shown in FIG. 5A, the bevel locking system 200 is in the unclamped state (or the unlocked state). More specifically, in an example embodiment, when the lever 210 is in the first position (or the unlocked position), the cam shaft 220 is rotated such that the first cam portion 224a of the cam shaft 220 is oriented to face the cam mating surface 236 of the locking arm 230. In this regard, the first cam portion 224a of the cam shaft 220 is spaced and disengaged from the cam mating surface 236 of the locking arm 230. In addition, the locking arm 230 disengages from a spring 250 such that the spring 250 transitions from a more compressed state to a less compressed state, thereby releasing the clamping force between the table assembly 120 and the bevel post 132. In this regard, when the clamping force is released, the table assembly 120 is released from the bevel post 132 in the first direction D1 to provide an appropriate gap, as shown in FIG. 6A, between the clamping surface 126 of the table assembly 120 and the clamping surface 146 of the support assembly 130. Accordingly, with an appropriate amount of space provided by the gap between the bevel post 132 and the hub portion 122a, the support assembly 130 is enabled to move to various bevel angle positions relative to the table assembly 120.

FIG. 6B is a cross-section of a side view of the support assembly 130 and the table assembly 120 in the clamped state (or the locked state) according to an example embodiment. In this regard, for example, when the lever 210 is in the second position (or the locked position), as shown in FIG. 5B, the bevel locking system 200 is in the locked state. More specifically, in an example embodiment, when the lever 210 is in the second position (or the locked position), the cam shaft 220 is rotated such that a first cam portion 224a of the cam shaft 220 is oriented to face away from the cam mating surface 236 of the locking arm 230 and a second cam portion 224b of the cam shaft 220 is oriented to face the cam mating surface 236 of the locking arm 230. When the cam shaft 220 is oriented in this manner, the second cam portion 224b of the cam shaft 220 pushes against the cam mating surface 236 of the locking arm 230. When the cam shaft 220 pushes against the locking arm 230, the locking arm 230 pushes against the spring 250, which applies a force on the mechanical fastener 260 in a second direction D2. In this regard, the bevel pin 240 is urged in the second direction D2 (FIG. 6B), which is opposite to the first direction D1 (FIG. 6A), such that the table assembly 120 moves in the second direction D2 by its connection to the bevel pin 240 via mechanical fastener 270. More specifically, the bevel pin 240 includes a groove 248 with abutment surfaces that push the mechanical fastener 270 of the hub portion 122a in the second direction D2 with sufficient force such that the table assembly 120 moves in the second direction D2. The movement of the hub portion 122a towards the bevel post 132 is provided with sufficient force to clamp or lock the table assembly 120 to the support assembly 130. Accordingly, when the lever 210 is in the second position (or the locked position), the bevel post 132 and the hub portion 122a are clamped or locked to each other such that the selected bevel angle is securely maintained.

Figure 7:
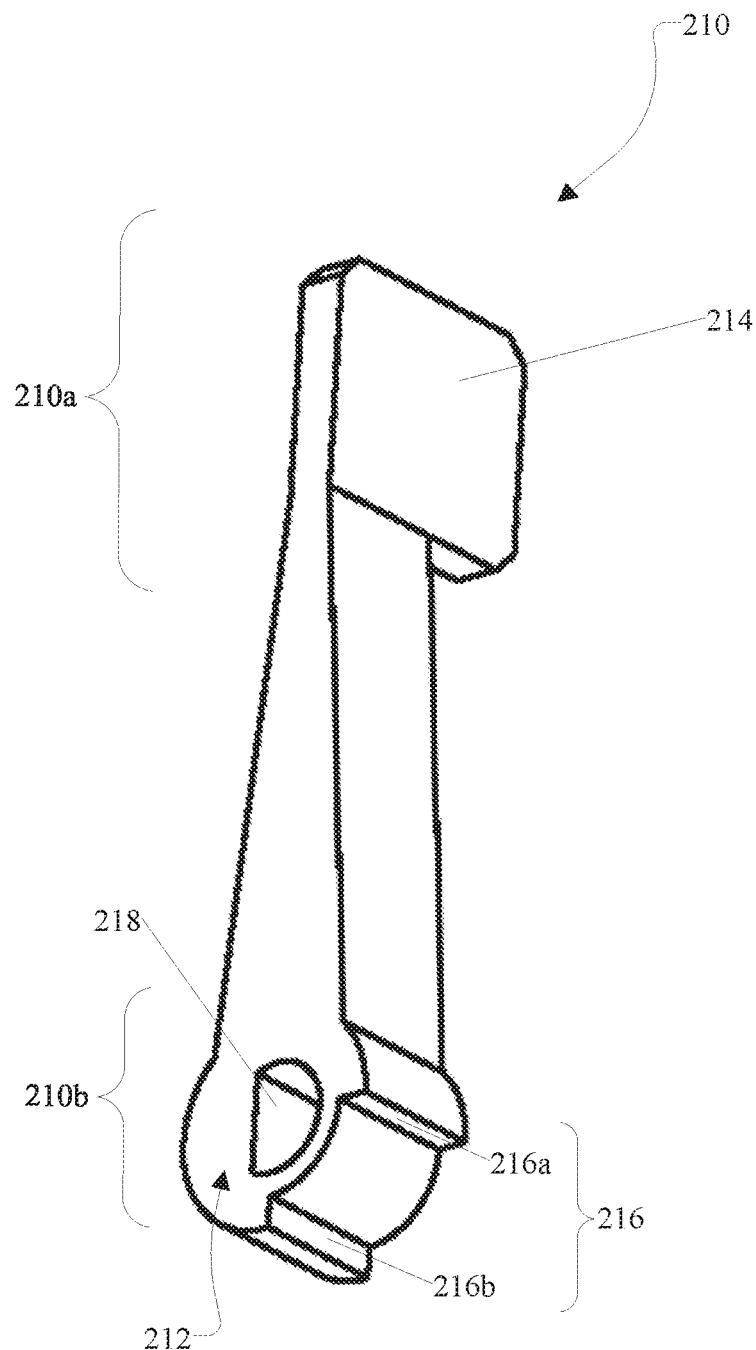
FIG. 7 is a perspective view of the lever according to an example embodiment of this disclosure.

FIG. 7 is a perspective view of the lever 210 according to an example embodiment. In an example embodiment, the lever 210 comprises a plastic material, a metal material (e.g., aluminum or zinc), or any suitable material. In an example embodiment, the lever 210 is an elongated structure that includes at least a handle 214 at a first end portion 210a and a connecting part 212 at a second end portion 210b. The handle 214 provides the user with the ability to easily grasp and rotate the lever 210 from the first position (or the unlocked position) to the second position (or the locked position), and vice versa. In an example embodiment, the connecting part 212 is structured to connect or mate with the cam shaft 220. In FIG. 7, for example, the connecting part 212 includes a cam shaft receiving portion 218. In this example, the cam shaft receiving portion 218 is a D-shaped through-hole, which is structured to correspond and mate with the D-shaped portion of the cam shaft 220, thereby enabling a turn of the lever 210 to correspond to a turn of the cam shaft 220.

In an example embodiment, the lever 210 comprises a guiding component, which is configured to guide the lever 210 into the first position (or the unlocked position) and the second position (or the locked position), respectively. In an example embodiment, the guiding component of the lever 210 is configured to interact with the guiding component of the bevel post 132. In this regard, the guiding component of the lever 210 is any suitable mechanical device that ensures the proper positioning of the lever 210, thereby ensuring the proper positioning of the cam shaft 220. For example, as shown in FIGS. 5A-5B, the guiding component of the lever 210 includes a recessed portion 216 with sidewalls that include a first abutment surface 216a and a second abutment surface 216b, which are structured to interact with the guiding component (or the protrusion 140) of the bevel post 132.

Figure 8:
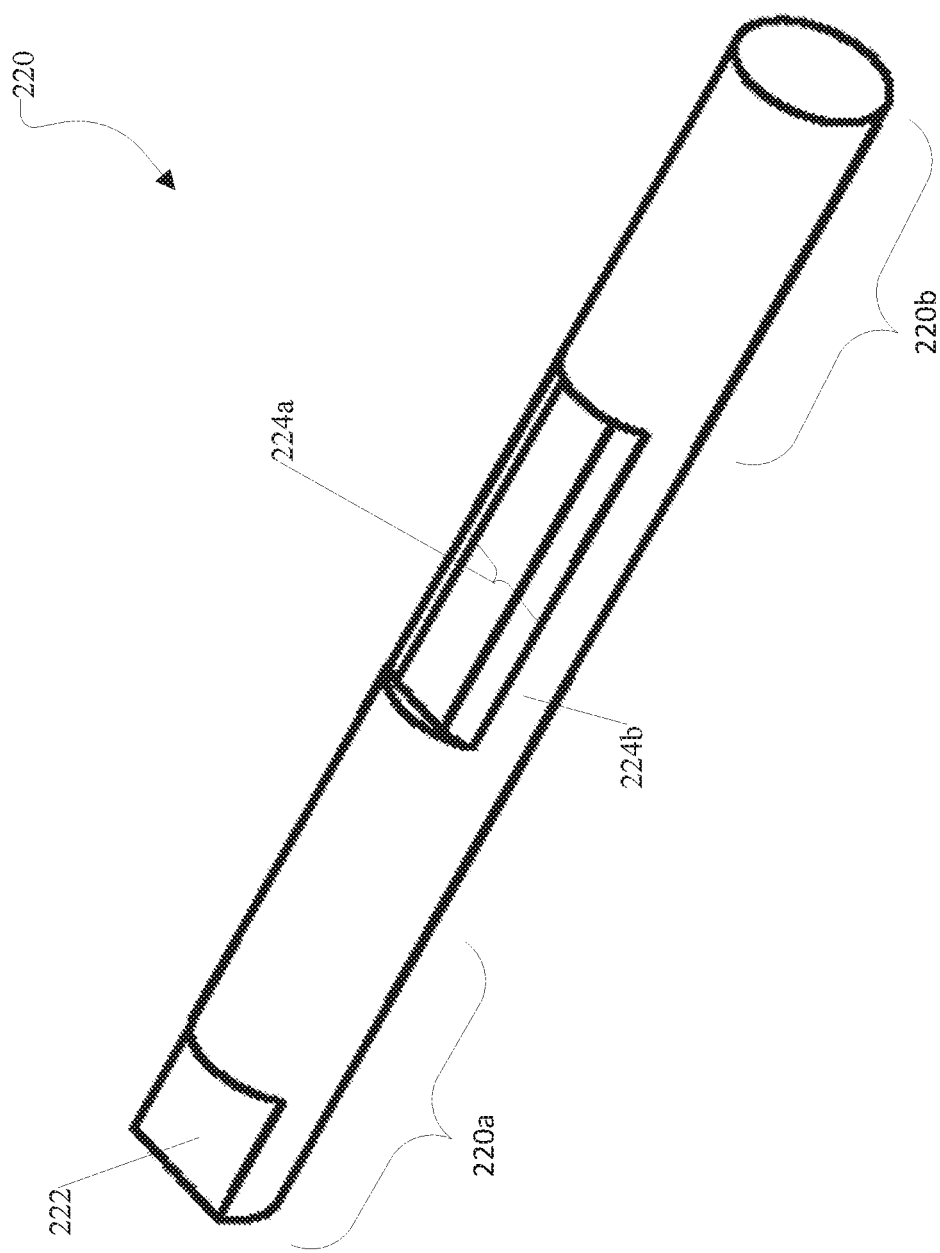
FIG. 8 is a perspective view of the cam shaft according to an example embodiment of this disclosure.

FIG. 8 is a perspective view of the cam shaft 220 according to an example embodiment. In an example embodiment, the cam shaft 220 is a rigid and strong structure. In this regard, for example, the cam shaft 220 comprises a metal material or any suitable material. In FIG. 8, for instance, the cam shaft 20 comprises steel or titanium. In an example embodiment, the cam shaft 220 is an elongated structure with a first end portion 220a and a second end portion 220b. In an example embodiment, the cam shaft 220 includes a lever connecting portion 222 at the first end portion 220a. In an example embodiment, the lever connecting portion 222 includes a suitable mechanical structure that provides a secure connection between the cam shaft 220 and the lever 210, thereby enabling a rotation of the lever 210 to lead to a rotation of the cam shaft 220. Also, in an example embodiment, the lever connecting portion 222 is structured to pass through the first through-hole 138a of the first sidewall portion 134a of the bevel post 132 such that the lever connection portion 222 is configured to connect to the lever 210, which is advantageously positioned on a lateral, exterior surface (e.g., the first sidewall portion 134a) of the bevel post 132. Also, in an example embodiment, the second end portion 220b is structured to pass through the second through-hole 138b of the second sidewall portion 134b of the bevel post 132. In this regard, for example, the cam shaft 220 is enabled to rotate within the bevel post 132 into the first position (or the unlocked position) and the second position (or the locked position).

In an example embodiment, the cam shaft 220 includes the first cam portion 224a between the first end portion 220a and the second end portion 220b. For example, in FIG. 8, the first cam portion 224a is a flat surface that provides the cam shaft 220 with a D-shaped cross-section between the first end portion 220a and the second end portion 220b. In this regard, the first cam portion 224a is structured such that the cam shaft 220 disengages from the locking arm 230, for example, by a gap that is created between the first cam portion 224a and the cam mating surface 236 when facing each other.

In an example embodiment, the cam shaft 220 includes the second cam portion 224b between the first end portion 220a and the second end portion 2220b. More specifically, as shown in FIG. 8, the second cam portion 224b is within the same section of the cam shaft 220 as that of the first cam portion 224a. For example, in FIG. 8, the second cam portion 220b is a curved surface of the D-shaped cross-section of the cam shaft 220. In this regard, the second cam portion 224b is structured such that the cam shaft 220 engages with the locking arm 230, for example, by having its curved surface push against the cam mating surface 236 of the locking arm 230 with sufficient force to transition the spring 250 from a less compressed state to a more compressed state.

Figure 9:
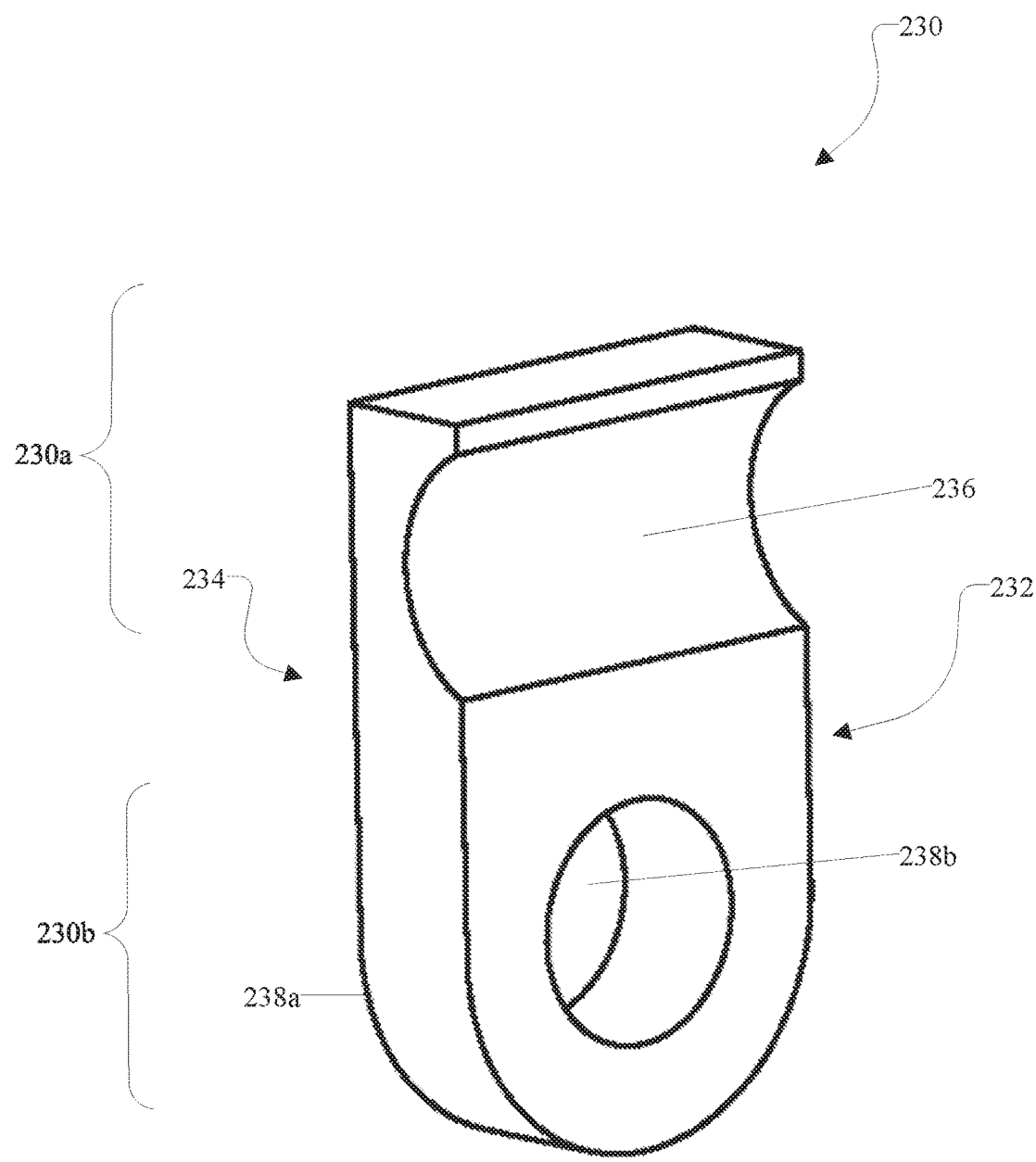
FIG. 9 is a perspective view of the locking arm according to an example embodiment of this disclosure.

FIG. 9 is a perspective view of the locking arm 230 according to an example embodiment. In an example embodiment, the locking arm 230 is a rigid structure. In this regard, for example, the locking arm 230 comprises a strong material, such as a metal material or any suitable material. For instance, in FIG. 9, the locking arm 230 comprises a powder metal material, steel, or the like. In an example embodiment, the locking arm 230 includes a front side 232 and a rear side 234. In an example embodiment, the front side 232 of the locking arm 230 faces the table assembly 120 (as shown in FIG. 4B and FIGS. 6A-6B) while the rear side 234 of the locking arm 230 faces in an opposite direction to that of the front side 232. In an example embodiment, the locking arm 230 is a structure with an upper portion 230a that engages with the cam shaft 220. In an example embodiment, at the upper portion 230a, the locking arm 230 includes at least the cam mating surface 236. In an example embodiment, the cam mating surface 236 is configured to interact with the first cam portion 224a of the cam shaft 220 when the lever 210 is in the first position (or the unlocked position) and the second cam portion 224b when the lever 210 is in the second position (or the locked position). For example, in FIG. 9, the cam mating surface 236 is a concave surface, which is structured to interact with the cam shaft 220.

In an example embodiment, the locking arm 230 includes a lower portion 230b, which is disposed below the cam mating surface 136. In an example embodiment, the lower portion 230b includes an abutment surface 238a, which is configured to interact with the spring 250, as shown in FIGS. 6A and 6B. In an example embodiment, the abutment surface 238a is located on the rear side 234 of the locking arm 230 such that the abutment surface 238a faces in an opposite direction to that of the cam mating surface 236. With this configuration, the abutment surface 238a of the locking arm 230 is configured to push against the spring 250 when the second cam portion 224b pushes against the cam mating surface 236 of the locking arm 230, as shown in FIG. 6B. In this regard, the abutment surface 238a is configured to assist in moving the bevel pin 40 in the second direction D2 such that the bevel locking system 200 is able to achieve the clamped state (or the locked state).

In an example embodiment, the lower portion 230b of the locking arm 230 includes a through-hole 238b, which is structured to receive the bevel pin 240. In an example embodiment, the through-hole 238b is sized to provide sufficient clearance for the bevel pin 240 to move within the through-hole 238b and along directions D1 and D2, which are parallel to the elongation direction of the bevel pin 240. In an example embodiment, since the bevel pin 240 is enabled to move through at least the through-hole 238b, the bevel pin 240 is enabled to cause the hub portion 122a of the table assembly 120 to move into the clamped state and the unclamped state with respect to the bevel post 132 of the support assembly 130.

Figure 10:
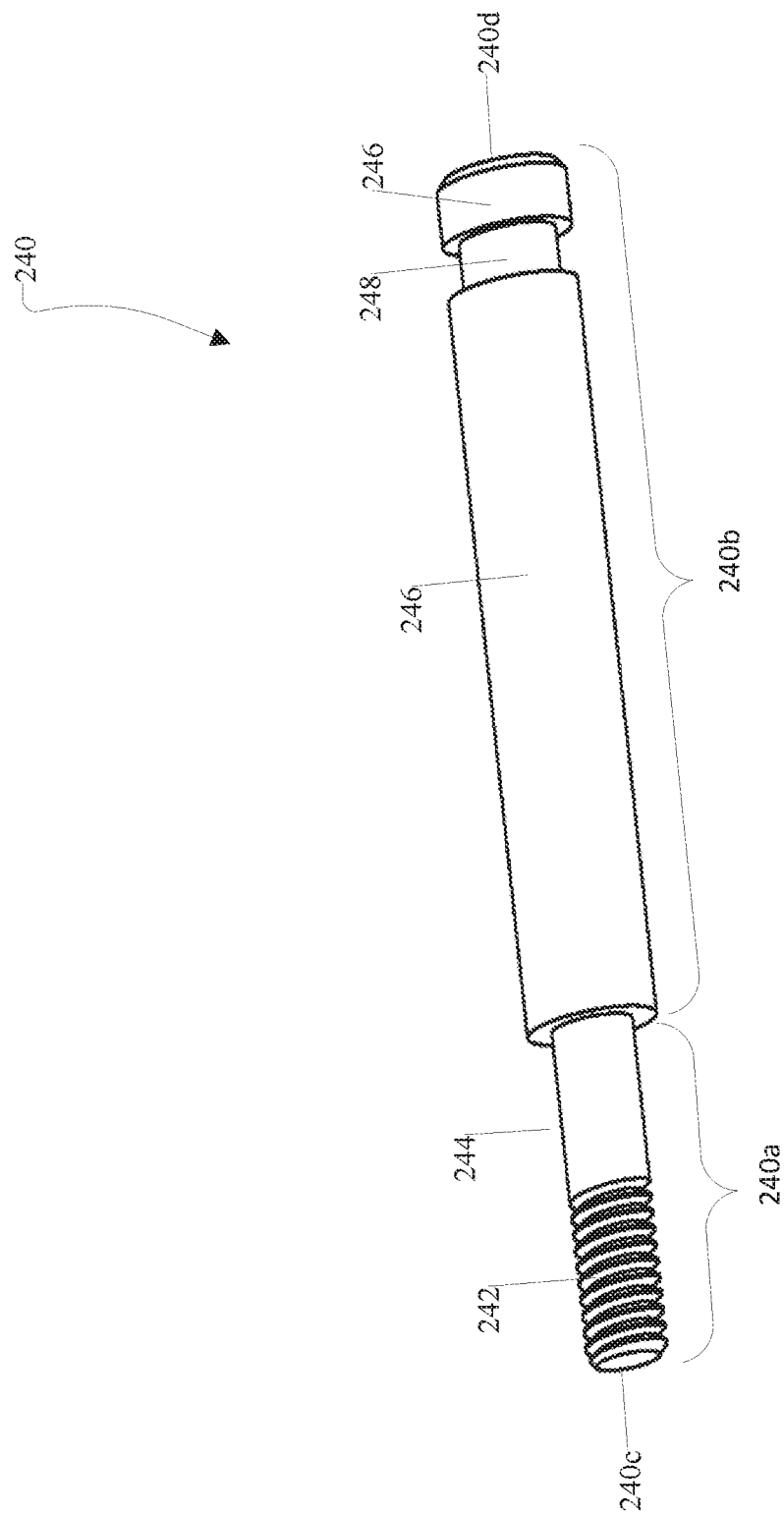
FIG. 10 is a perspective view of the bevel pin according to an example embodiment of this disclosure.

FIG. 10 is a perspective view of the bevel pin 240 according to an example embodiment. In an example embodiment, the bevel pin 240 is configured to connect the hub portion 122a of the table assembly 120 to the bevel post 132 of the support assembly 130. In an example embodiment, the bevel pin 240 enables the bevel post 132 to pivot about the hub portion 122a to different bevel angle positions. In this regard, for example, the bevel pin 240 comprises at least one metal or any suitable material. For instance, in FIG. 10, the bevel pin 240 comprises steel.

In an example embodiment, the bevel pin 240 is an elongated structure, which includes a first end portion 240a and a second end portion 240b. In an example embodiment, the bevel pin 240 extends from a first end surface 240c to a second end surface 240d. In this regard, for example, the first end portion 240a includes the first end surface 240c of the bevel pin 240 and the second end portion 240b includes the second end surface 240d of the bevel pin 240. In an example embodiment, the first end portion 240a has different dimensions than that of the second end portion 240b. In FIG. 10, for example, a diameter of the first end portion 240a is smaller than the diameter of the second end portion 240b. Also, in FIG. 10, for example, a length of first end portion 240a is smaller than a length of the second end portion 240b.

In an example embodiment, the first end portion 240a includes a threaded section 242 and a non-threaded section 244. In an example embodiment, the threaded section 242 is configured to receive the mechanical fastener 260, as shown in FIGS. 6A-6B. In this regard, for example, the threads of the threaded section 242 are configured to ensure that the mechanical fastener 260, such as a flat washer 260a and a nut 260b, are secured to the bevel pin 240. Also, in an example embodiment, the non-threaded portion 244 is configured to receive the spring 250, as shown in FIGS. 6A-6B. In an example embodiment, the non-threaded portion 244 includes a smooth outer surface such that the spring 250 can freely move in the first direction D1 when the locking arm 230 is disengaged from the spring 250 and the second direction D2 when the locking arm 230 is engaged with the spring 250.

In an example embodiment, the second end portion 240b is structured to pass through the bevel pin receiving portion 128 of the table assembly 120 and the bevel pin receiving portion 144 of the bevel post 132. In this regard, for example, the bevel pin 240 is structured to have a length that is longer than the combined length of the bevel pin receiving portion 128 and the bevel pin receiving portion 144 so that the bevel pin 240 is configured to extend fully within and beyond each of the bevel pin receiving portions 128 and 144. In an example embodiment, the extension of the second end portion 240b beyond the bevel pin receiving portion 144 is configured to pass through the through-hole 238b of the locking arm 230, as shown in FIGS. 6A-6B.

In an example embodiment, the second end portion 240b includes a main section 246 and a groove 248. In an example embodiment, the main section 246 forms a greater part of the second end portion 240b than that of the groove 248. In an example embodiment, the groove 248 is defined within the main section 246 and is spaced from the second end surface 240d, as shown in FIG. 10. In an example embodiment, the groove 248 is configured to receive the mechanical fastener 270, such as a set screw or any suitable device, as shown in FIGS. 6A-6B. In an example embodiment, the groove 248 includes sidewalls, which are structured to provide abutment surfaces for the mechanical fastener 270. In this regard, for example, when the bevel pin 240 moves in the first direction D1 or the second direction D2, the sidewalls of the groove 248 are configured to move the table assembly 120 by abutting against the mechanical fastener 270 in the first direction D1 or the second direction D2.

In an example embodiment, the mechanical fastener 270 is any suitable mechanical device, which is configured to connect to the table assembly 120 and move the table assembly 120 in accordance with its interaction with the bevel pin 240. For example, in FIGS. 6A-6B, the mechanical fastener 270 is a set screw, which is securely fastened to the table assembly 120. Also, as shown in FIGS. 6A-6B, the mechanical fastener 270 is configured to be received within the groove 248 of the bevel pin 240. With this configuration, the mechanical fastener 270 is configured to move the table assembly 120 in the first direction D1 when the bevel pin 240 is released in the first direction D1 due to the engagement of the mechanical fastener 270 with at least one of the sidewalls of the groove 248 of the bevel pin 240. In addition, the mechanical fastener 270 is configured to move the table assembly 120 in the second direction D2 when the bevel pin 240 is urged in the second direction D2 due to the engagement of the mechanical fastener 270 with at least one of the sidewalls of the groove 248 of the bevel pin 240.

As discussed above, the bevel locking system 200 includes a number of advantageous features. In this regard, for example, the bevel locking system 200 includes the lever 210, which is conveniently located on a sidewall portion of the bevel post 132. This lateral positioning of the lever 210 enables a user to access and manipulate the lever 210 with ease. In this regard, since the lever 210 is located on a lateral side of the power tool apparatus 100 and not a rear side of the power tool apparatus 100, a user can access the lever 210 without having to reach behind the cutting tool. Moreover, the bevel locking system 200 is configured to provide this lever 210 on a sidewall portion of the bevel post 132 without requiring, for instance, brake pads, brake rotors, and the like. In this regard, the bevel locking system 200 is able to realize cost-savings, material-savings, manufacturing benefits, and other advantages by not requiring these types of braking parts.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of this disclosure as defined in the claims that follow.

What is claimed is:

1. A bevel locking system configured to provide an unclamped state and a clamped state to a table assembly relative to a bevel post, the table assembly including (a) a table portion with a work surface and (b) a hub portion with a first clamping surface, the bevel post including a second clamping surface, the bevel locking system comprising:
   a bevel pin pivotally connecting the bevel post to the hub portion;
   a spring configured to bias a movement of the bevel pin;
   a locking arm configured to (i) disengage the spring such that the bevel pin releases the table assembly from the bevel post in a first direction and (ii) engage the spring such that the bevel pin moves the table assembly towards the bevel post in a second direction; and
   a lever movable between an unlocked position and a locked position,
   wherein:
      the hub portion includes a first post that is configured to receive a portion of the bevel pin and enable the bevel pin to move in the first direction and the second direction;
      the bevel post includes a second post that is configured to receive a portion of the bevel pin and enable the bevel pin to move in the first direction and the second direction;
      the first post of the hub portion is aligned with the second post of the bevel post;
      when the lever is in the unlocked position, the first clamping surface of the hub portion is in an unclamped state with the second clamping surface of the bevel post; and
      when the lever is in the locked position, the first clamping surface of the hub portion is in a clamped state with the second clamping surface of the bevel post.

2. The bevel locking system of claim 1, further comprising:
   a cam shaft including a first cam portion and a second cam portion, the cam shaft being configured to rotate into (a) a first position in which the first cam portion faces the locking arm when the lever is in the unlocked position and (b) a second position in which the second cam portion engages with the locking arm when the lever is in the locked position, wherein:
when the first cam portion faces the locking arm, the locking arm is configured to release pressure on the spring such that the spring transitions from a more compressed state to a less compressed state, and
when the second cam portion engages with the locking arm, the locking arm is configured to transition the spring from the less compressed state to the more compressed state.

3. The bevel locking system of claim 1, wherein the first clamping surface of the hub portion is perpendicular to the work surface of the table portion.

4. The bevel locking system of claim 1, wherein:
the spring is coaxial with the bevel pin; and
the bevel pin includes at least one mechanical fastener that secures the spring on the bevel pin and causes the bevel pin to move in the second direction when the spring abuts against the at least one mechanical fastener.

5. The bevel locking system of claim 1, wherein:
the bevel pin includes a groove; and
the hub portion includes a set screw that is secured to the table assembly and configured to fit within the groove of the bevel pin, the set screw being configured to move the table assembly in accordance with a movement of the bevel pin.

6. The bevel locking system of claim 1, wherein:
the bevel post includes a first rib and a second rib, the first and second ribs extending along an axis that is perpendicular to a longitudinal axis of the bevel pin; and
the first and second ribs are configured to hold the locking arm such that the locking arm is configured to move with the bevel post.

7. The bevel locking system of claim 1, wherein the lever is disposed on a sidewall portion of the bevel post.

8. A power tool apparatus comprising:
a power tool;
a table assembly including a table portion with a work surface for the power tool and a hub portion with a first clamping surface;
a bevel post with a second clamping surface;
a bevel pin pivotally connecting the bevel post to the hub portion;
a spring configured to bias a movement of the bevel pin;
a locking arm configured to (i) disengage the spring such that the bevel pin releases the table assembly from the bevel post in a first direction and (ii) engage the spring such that the bevel pin urges the table assembly toward the bevel post in a second direction; and
a lever movable between an unlocked position and a locked position,
wherein:
the hub portion includes a first receiving portion to receive a portion of the bevel pin and enable the bevel pin to move in the first direction and the second direction;
the bevel post includes a second receiving portion to receive a portion of the bevel pin and enable the bevel pin to move in the first direction and the second direction;
the first receiving portion of the hub portion is aligned with the second receiving portion of the bevel post;
when the lever is in the unlocked position, the first clamping surface of the hub portion is in an unclamped state with the second clamping surface of the bevel post; and
when the lever is in the locked position, the first clamping surface of the hub portion is in a clamped state with the second clamping surface of the bevel post.

9. The power tool apparatus of claim 8, further comprising:
a cam shaft including a first cam portion and a second cam portion, the cam shaft being configured to rotate into (a) a first position in which the first cam portion faces the locking arm when the lever is in the unlocked position and (b) a second position in which the second cam portion engages with the locking arm when the lever is in the locked position,
wherein:
when the first cam portion faces the locking arm, the locking arm is configured to release pressure on the spring such that the spring transitions from a more compressed state to a less compressed state; and
when the second cam portion engages with the locking arm, the locking arm is configured to transition the spring from the less compressed state to the more compressed state.

10. The power tool apparatus of claim 8, wherein the first clamping surface of the hub portion is perpendicular to the work surface of the table portion.

11. The power tool apparatus of claim 8, wherein:
the spring is coaxial with the bevel pin; and
the bevel pin includes at least one mechanical fastener that secures the spring on the bevel pin and causes the bevel pin to move in the second direction when the spring abuts against the at least one mechanical fastener.

12. The power tool apparatus of claim 8, wherein:
the bevel pin includes a groove; and
the hub portion includes a set screw that is secured to the table assembly and configured to fit within the groove of the bevel pin, the set screw being configured to move the table assembly in accordance with a movement of the bevel pin.

13. The power tool apparatus of claim 8, wherein:
the bevel post includes a first rib and a second rib, the first and second ribs extending along an axis that is perpendicular to a longitudinal axis of the bevel pin; and
the first and second ribs are configured to hold the locking arm such that the locking arm moves with the bevel post.

14. The power tool apparatus of claim 8, wherein the lever is disposed on a surface of the bevel post.

15. The power tool apparatus of claim 8, wherein the locking arm is housed within the bevel post.

16. A saw apparatus comprising:
a cutting assembly including a cutting blade;
a table assembly including a table portion with a work surface for the cutting blade and a hub portion with a first clamping surface;
a bevel post configured to support the cutting assembly, the bevel post including a second clamping surface;
a bevel pin pivotally connecting the bevel post to the hub portion;
a spring configured to bias a movement of the bevel pin;
a locking arm configured to (i) disengage the spring such that the bevel pin releases the table assembly from the bevel post in a first direction and (ii) engage the spring such that the bevel pin moves the table assembly towards the bevel post in a second direction; and
a lever movable between an unlocked position and a locked position, wherein:
the hub portion includes a first post that is configured to receive a portion of the bevel pin and enable the bevel pin to move in the first direction and the second direction;
the bevel post includes a second post that is configured to receive a portion of the bevel pin and enable the bevel pin to move in the first direction and the second direction;
the first post of the hub portion is aligned with the second post of the bevel post;
when the lever is in the unlocked position, the first clamping surface of the hub portion is in an unclamped state with the second clamping surface of the bevel post; and
when the lever is in the locked position, the first clamping surface of the hub portion is in a clamped state with the second clamping surface of the bevel post.

17. The saw apparatus of claim 16, further comprising:
a cam shaft including a first cam portion and a second cam portion, the cam shaft being configured to rotate into (a) a first position in which the first cam portion faces the locking arm when the lever is in the unlocked position and (b) a second position in which the second cam portion engages with the locking arm when the lever is in the locked position,
wherein:
when the first cam portion faces the locking arm, the locking arm is configured to release pressure on the spring such that the spring transitions from a more compressed state to a less compressed state; and
when the second cam portion engages with the locking arm, the locking arm is configured to transition the spring from the less compressed state to the more compressed state.

18. The saw apparatus of claim 16, wherein the first clamping surface of the hub portion is perpendicular to the work surface of the table portion.

19. The saw apparatus of claim 16, wherein:
the spring is coaxial with the bevel pin; and
the bevel pin includes at least one mechanical fastener that secures the spring on the bevel pin and causes the bevel pin to move in the second direction when the spring abuts against the at least one mechanical fastener.

20. The saw apparatus of claim 16, wherein:
the bevel pin includes a groove; and
the hub portion includes a set screw that is secured to the table assembly and configured to fit within the groove of the bevel pin, the set screw being configured to move the table assembly in accordance with a movement of the bevel pin.

* * * * *